April 4, 1950 W. M. GOODALL 2,502,942

REGENERATIVE RELAY REPEATER

Filed May 28, 1948 3 Sheets-Sheet 1

INVENTOR
W. M. GOODALL
BY H. A. Burgess
ATTORNEY

INVENTOR
W. M. GOODALL
BY H. A. Burgess
ATTORNEY

April 4, 1950 W. M. GOODALL 2,502,942

REGENERATIVE RELAY REPEATER

Filed May 28, 1948 3 Sheets-Sheet 3

INVENTOR
W. M. GOODALL
BY
H. A. Burgess
ATTORNEY

Patented Apr. 4, 1950

2,502,942

UNITED STATES PATENT OFFICE 2,502,942

REGENERATIVE RELAY REPEATER

William M. Goodall, Oakhurst, N. J., assignor to Bell Telephone Laboratories, Incorporated, New York, N. Y., a corporation of New York Application May 28, 1948, Serial No. 29,770

3 Claims. (Cl. 178—70)

The present invention relates to a regenerative repeater for pulse transmission systems. A regenerative repeater is one which produces and sends out new pulses under control of received pulses.

Heretofore it has been proposed to produce the new pulses at the repeater by means of a generator running independently of the received pulses and supposedly producing pulses at the rate of the pulse transmitted over the system. These locally produced pulses are either sent out or are suppressed depending upon whether or not there is a currently received pulse to be repeated.

Where independently running oscillators are relied on to supply pulses for regenerative repeating, the variations in phase or frequency that are bound to occur with time in such oscillators become a limiting factor in the design and operation of repeaters. This is especially the case where several repeaters are to be used in tandem since the errors become cumulative from repeater to repeater. In multichannel pulse code modulation systems, the pulse rate may be too high to make it feasible to depend upon independent oscillators to supply pulses for regenerative repeating.

An object of this invention is to supply local pulses at the repeater and to vary the pulses in time or phase under control of received pulses so as to maintain the locally supplied pulses at the repeater in correct time and phase.

A subsidiary object is to control the frequency or phase of an oscillator to maintain fixed phase relation with respect to control pulses.

The nature and objects of the invention will appear more fully from the following detailed description of an illustrative embodiment shown in the attached drawings in which.

When code pulses are received at a repeater they are first passed through a clipper to remove amplitude variations. The presence of noise may cause the clipper to operate at a slightly earlier or later time than it would operate if the signal were free of noise. This causes the leading and trailing edges of the clipped pulses to vary in time from pulse to pulse, an effect known as "jitter" in the pulse transmission art. Under severe noise conditions or after traversing several repeaters the pulse might become lengthened sufficiently to extend over into the time assigned to an adjacent pulse and thus cause an error in the message as received. It is for this reason that it is necessary to regenerate the pulses at a repeater so that the new pulses may be sent out in proper time and with proper spacing and length.

Where independently running local oscillators are relied upon to supply the timing for the regenerated pulses, the slow drift in phase or frequency in these local oscillators causes the locally supplied pulses to get out of correct phase relation for proper regenerative repeating. As stated, these errors become cumulative in a succession of repeaters and may add up to a time shift sufficient to cause errors in the finally received message.

On the other hand, the local oscillator must not be allowed to follow variations that get into the incoming pulses due to noise or variables in the system since the local oscillator is supposed to eliminate such variations by regenerating pulses having proper amplitude, length, timing and spacing, for transmission from the repeater.

In accordance with this invention, an average timing is derived from incoming code pulses and this average is taken over a sufficiently long time to eliminate the variations introduced by noise or other unsystematic variables. This derived timing is then used to maintain the local pulse source in correct time and phase relation. In this way the local pulses are left independent of rapid variations in timing of received pulses (as represented by the leading and trailing edges of the clipped pulses) and so permit the full advantage of regenerative repeating to be realized; but at the same time the error due to phase or time shifts in the local oscillators in the various repeaters are avoided by maintaining these oscillators under control of the fundamental or basic pulse frequency as determined at the transmitting terminal.

Figure 1:
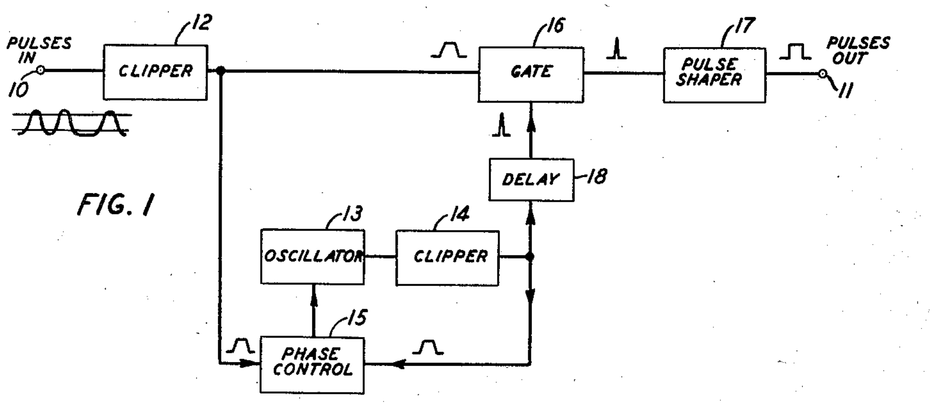
Fig. 1 is a block schematic diagram of a repeater station according to the invention.

Referring first to Fig. 1, the incoming pulses to be repeated are received at terminal 10 and the reformed outgoing pulses appear on output terminal 11. A clipper circuit 12 is used to derive from the incoming pulses, which usually have a rounded and more or less irregular shape, pulses of reasonably steep wave front and flat top suitable for application to the gate circuit 16. The locally produced pulses originate in an oscillator 13 which may be a crystal controlled oscillator of highly constant frequency provided with an automatic phase control. The output from the oscillator 13 is sent through a clipper 14 which produces steep-front flat-topped pulses. These, together with the pulses in the output of clipper 12, are fed into the phase control 15 where they are compared against each other as to phase.

If the locally produced pulses vary in phase from time to time, with respect to the average of the received pulses, these variations show up in the output circuit of the phase control 15 as a variable current which is used to govern the phase of the oscillator 13 in such manner as to cause the pulses in the output of the clipper 14 to be maintained in close phase agreement with the output pulses from clipper 12.

The output pulses from the clipper 14 are passed through a phase delaying and voltage peaking circuit 18 to cause the resulting pulses as applied to the gate 16 to coincide with about the center of the received pulses from clipper 12. The gate circuit 16 produces an output pulse only when there is an input pulse on each of the leads from the clipper 12 and the circuit 18. The output pulses from the gate 16 are given proper shape in the circuit 17, the output of which leads to the output terminal 11.

It is seen from this general description that the phase control 15 insures correct timing of the regenerated pulses and enables the gating pulses supplied from circuit 18 to the gate 16 to be always maintained in the correct phase relation with respect to the received pulses from the clipper 12, regardless of slight variations in length or shape of the latter pulses. The amount of delay introduced at 18 is sufficient to cause the locally produced peaked wave applied to the gate 16 to coincide with about the middle of the wave from the clipper 12.

Figure 4:
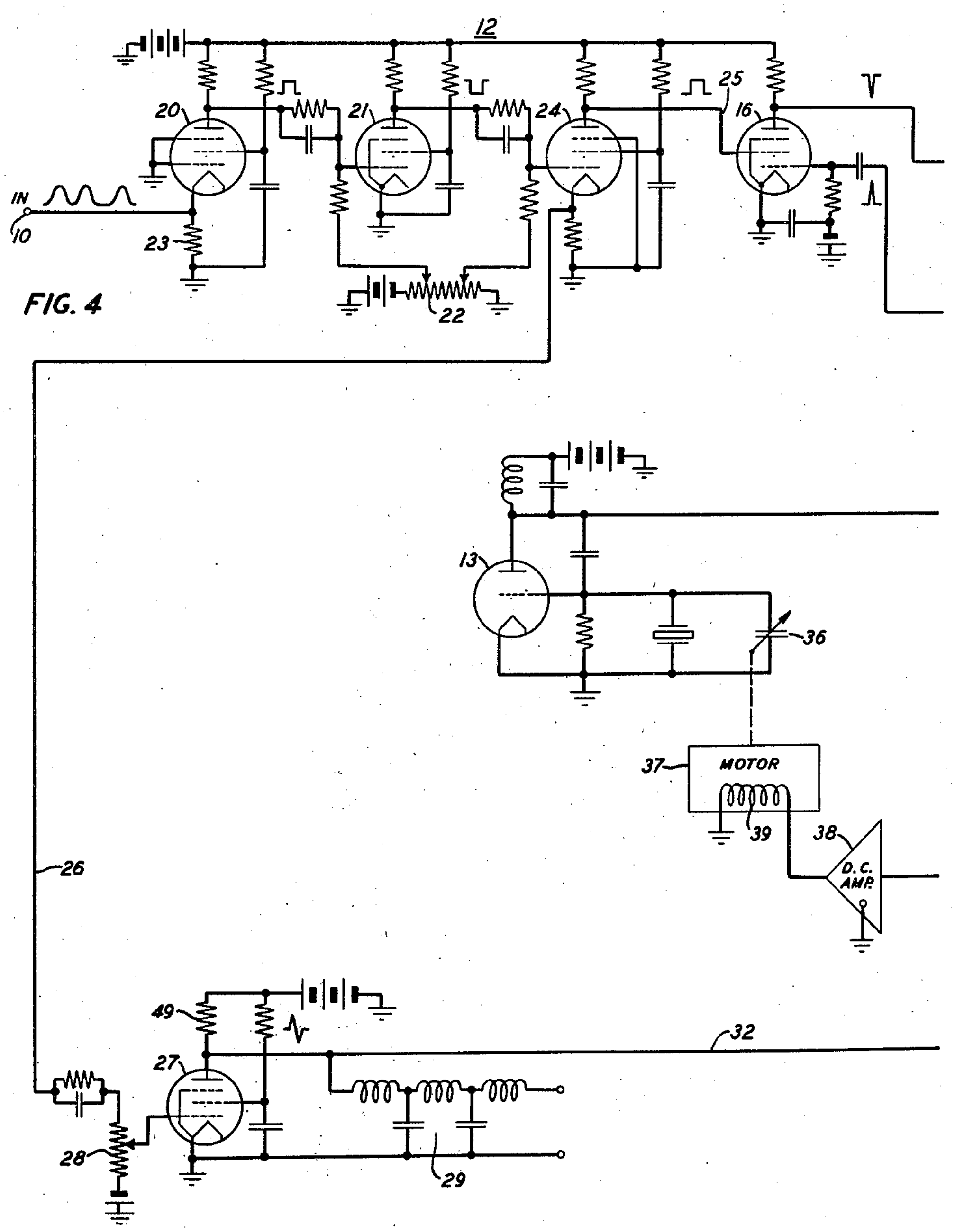
Figs. 4 and 5, when placed together with Fig. 5 to the right of Fig. 4, show the schematic circuit diagram of a complete repeater circuit according to the invention.
Figure 5:
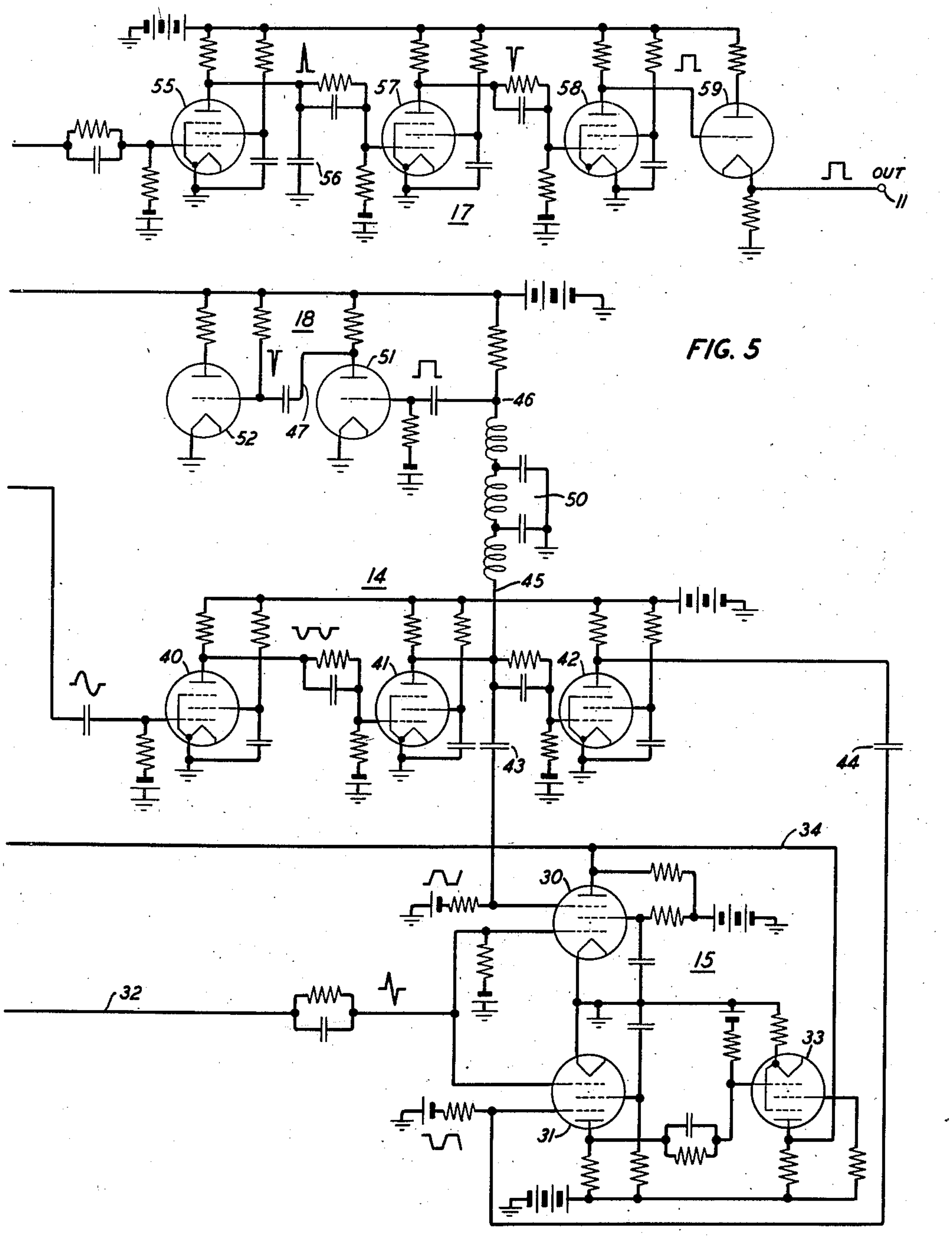

Referring now to the complete circuit shown in Figs. 4 and 5, the clipper 12 consists of an input tube 20 and the two tandem limiting tubes 21 and 24. The tube 20 operates as a grounded grid tube, the signals on terminal 10 being applied to the cathode end of the resistor 23. Tubes 21 and 24 have the proper amount of control grid bias furnished to them from potentiometer 22 to cause these tubes to limit the incoming pulses at both the top and the bottom portions. Tube 24 has one output connection from the plate of the tube over lead 25 to the control grid of the gate 16 and it has another output from the cathode resistor over lead 26 to the grid of tube 27. The plate load of the tube 27 consists of an open-circuited delay line 29 with a round trip delay that is short compared to the pulse length. This results in differentiation of the pulse, producing a positive "pip" for the leading edge and a negative "pip" for the trailing edge of the pulse. Negative bias is supplied to the control grid of the tube 27 from potentiometer resistor 28. Resistor 49 in the plate feed circuit forms a terminating impedance for delay line 29.

The oscillator 13 is shown as a triode piezo-crystal generator with a variable capacitor 36 in shunt of the crystal for permitting slight variations in the frequency or phase of the oscillator. The condenser 36 is adjusted by motor 37 which has a shaft shown in the diagrammatic sketch as driving the rotary element of the variable capacitor 36.

The locally generated oscillations at 13 are applied to the clipper 14 consisting of input tube 40 followed by two limiting stages 41 and 42. Suitable negative grid bias is applied to the control grids of these two tubes to cause them to operate at the proper point of their characteristic to provide limiting. Approximately square-shaped waves appear on the plate of tube 41 and similarly shaped waves shifted 180 degrees in phase appear on the plate of tube 42.

The phase comparison circuit 15 is essentially a balanced or differential modulator circuit comprising push-pull tubes 30 and 31 with tube 31 followed by a phase reversing tube 33. Square waves from the clipper 14 are applied in opposite phase to the suppressor grids of the tubes 30 and 31 through respective coupling capacities 43 and 44. The short sharp pulses from the tube 27 are applied over conductor 32 to the control grids of tubes 30 and 31 in the same phase. In order to permit the output currents from tubes 30 and 31 to be added in the desired phase, the phase inverting tube 33 is used for the output of tube 31, the plate of tube 33 being directly connected to the plate of tube 30 over a circuit 34 and thence to a direct current amplifier 38, the output of which is connected to a field winding 39 of the motor 37.

The direct current amplifier 38 does not give output current of both signs but only increases and decreases of current above and below a normal value. Motor 37 can, however, be reversed, for example by decrease in output of direct current from the amplifier, by use of another field winding (not shown) supplied with a constant current of just the right value to cause the two fields to cancel when the field 39 is supplied with the normal value of current from amplifier 38. Increases in amplifier output current above normal drive the motor forward and decreases below normal current drive the motor backward.

Figure 2:
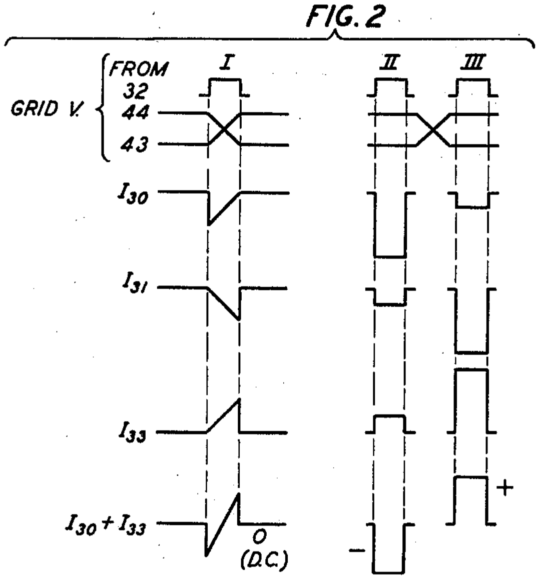
Figs. 2 and 3 show graphs of wave forms to be referred to in connection with the description.

The operation of the automatic phase control will be described with the aid of the graphs shown in Fig. 2. The suppressor grids of tubes 30 and 31 are biased negatively to cut-off and these tubes conduct only on the positive portions of the sharp voltage waves received from tube 27. (It will be noted that the interstage plate-to-grid couplings shown throughout the circuit drawings are adapted for the transmission of direct current as well as high frequencies by including both capacity and resistance.) The graphs in Fig. 2 are in three columns I, II and III. Column I represents the balanced conditions in which no phase correction is to be made. At the top is shown the positive voltage "pip" from lead 32, somewhat magnified for clarity of illustration. Just below this, the two intersecting graphs represent the crossover point at which the pulses received from the clipper 14 through the capacities 43 and 44 are reversing in sign. The next three graphs lower down in the figure show respectively the shape of the plate current pulse in tubes 30, 31 and 33. The lowermost curve shows the resultant of adding together the plate pulses from tubes 30 and 33 and this is the current which goes into the input of the direct current amplifier 38. Under the conditions represented in column I, the negative and positive portions exactly balance each other giving no resultant direct current. This type of pulse has no effect on the motor 37.

In column II the voltage "pip" from the tube 37 received over lead 32 arrives slightly before the reversal time of the pulses from the limiter 14. Following this column downward in the figure, the $I_{30}$ and $I_{31}$ pulses show that a much larger reduction occurs in the space current of tube 30 than in that of tube 31. When the output of tube 31 is inverted in sign by tube 33 and added algebraically to the output from tube 30, it is seen that the resultant is a negative pulse shown at the bottom of column II. This condition therefore results in the production of an increment of negative direct current which causes a reduction in output current in amplifier 38. This, when applied to the motor 37, causes an adjustment in the condenser 36 in such direction as to tend to minimize the amount of negative direct current produced; that is, to restore the circuit to a balanced condition.

Column III represents the condition in which the positive "pip" from lead 32 arrives after the reversal time of the pulses from the limiter 14 and, as seen from following down the column, this results in the production of a positive pulse of direct current which is in the direction to make an adjustment in condenser 36 opposite in sign to that corresponding to the condition in column II and thus to restore the circuit to normal.

These control means including motor 37 have considerable time lag, so that the over-all result of the operation just described is to make corrective changes in the phase of the output of the oscillator 13 slowly and in such manner as to hold the square waves in the output of the clipper circuit 14 accurately in step with the average of the pulse rate of the received code pulses. This condition is indicated in Fig. 3 by the uppermost and lowermost graphs of this figure, respectively, where the incoming signal pulse applied to the control grid of gate 16 from lead 25 is shown at the bottom of the figure and the square wave from the clipper 14 is shown at $E_{45}$ at the top of this figure (zero noise assumed for simplicity).

Figure 3:
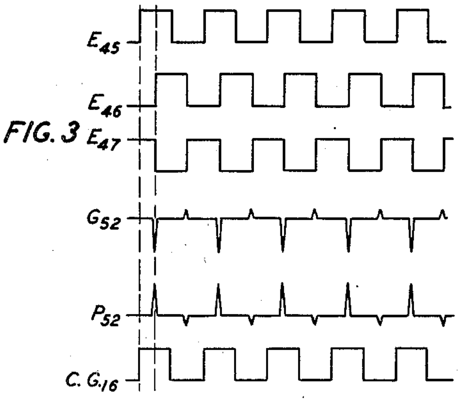

These square waves from the clipper 14 are not applied directly to the control grid of the gate 16 but are applied over lead 45 to the input end of a delay network 50 which delays the pulse for a time equivalent to about one-half the pulse length, as shown at the top of Fig. 3 by the graphs $E_{45}$ and $E_{46}$. The graph $E_{46}$ shows the shape of the wave applied to the grid of the tube 51. This tube acts as a buffer amplifier to prevent any reaction on tube 30. The condenser-resistance combinations in the interstage circuit between tubes 51 and 52 differentiate the square wave to produce the timing "pips" ($P_{52}$) that are used to regenerate the timing pulses for the repeater output. It will be noted that tube 52 has its grid normally highly positive so that the impressed positive "pips" from tube 51 have no effect on the plate current of this tube, but the negative "pips" drive this tube to cut-off thus producing very sharp, high-amplitude, voltage pulses for application to the control grid of the gate tube 16.

Tube 16 is biased negatively by the grid bias battery shown connected to its control grid, to such an extent that no output current is obtained unless both a signal pulse is applied to the screen grid from circuit 25 and a positive "pip" is applied simultaneously to the control grid from tube 52. (The signal pulse may be thought of as a pedestal pulse and the short timing pulse a gating pulse.) The result is that for each received signal pulse, and only when a signal pulse is present together with a timing voltage pulse, an output pulse is sent from the gate tube 16 into the pulse-forming amplifier 17. This pulse as it appears at the plate of tube 16 is a short sharp drop in voltage. The interstage circuits and particularly the shunt condenser 56 in the output of tube 55, operate to lengthen this pulse out to the required length, and clipping takes place in tube 58 by virtue of the large negative bias applied to the control grid. This results in application to the control grid of tube 59 of a positive square voltage wave which is amplified in tube 59 and applied to output terminal 11, tube 59 acting as a cathode follower.

An illustrative example of an actual system in which the invention might be a 100-channel multiplex telephone system using pulse code modulation with a repetition rate of 8 kilocycles per second and a 7-digit code. The pulse rate would be $8{,}000\times7\times100=5{,}600{,}000$ pulses per second. This is the frequency of local oscillator at a repeater. For proper regeneration, the phase of the oscillator preferably should be within $\pm$ 30° of the phase of the incoming pulses, or within about $\frac{1}{10}$ cycle. This corresponds to an accuracy of frequency of the order of one part in $5\times10^7$. This accuracy can be realized by using an oscillator having an accuracy of one part in $10^7$ or $10^8$, which is within the range of practical design, and controlling its frequency so that it is held in phase agreement with the received pulses.

Without such control, the oscillator would, in a matter of seconds, drift into the wrong phase relation. By using highly stable oscillators at the transmitter and repeaters the control can be made sufficiently sluggish to allow a noise reduction to be realized in the frequency control circuits. A frequency response which is too slow to admit the whole signal frequency band but which will follow the fundamental pulse frequency can be used.

The invention is not to be construed as limited to the particular circuit arrangement disclosed, nor to the numerical or other values given, since these are to be taken as illustrative and by way of example rather than as limiting, the scope of the invention being defined by the claims.

What is claimed is:

1. A regenerative repeater for on-off signal pulses comprising an electronic oscillator producing oscillations of frequency equal to the normal pulse rate of the incoming signal pulses, phase regulating means for said oscillator, means for comparing the relative phasing of the output of said oscillator and of the incoming signal pulses to produce a control voltage dependent on said relative phase, means responsive to said voltage for controlling said phase regulating means, means for delaying and differentiating the output oscillations of said oscillator to produce pulses of shorter duration than the normal signal pulses and occurring at substantially the center of the signal pulse intervals, a gating device having one input circuit connected to receive incoming signal pulses, a second input circuit connected to receive said pulses of shorter duration and an output circuit in which said pulses of shorter duration are repeated only in response to on signalling pulses and said pulses of shorter duration appearing simultaneously in said input circuits, and a pulse shaping circuit connected to said output for producing from said repeated pulses of shorter duration, pulses of longer duration substantially equal to the normal on signalling pulses.

2. A regenerative repeater according to claim 1 in which said pulse shaping circuit comprises a plurality of tandem connected electron tubes, a coupling circuit between two of said tubes including a capacitor of such capacitance as to produce pulses of duration equal to the normal on signalling pulses in response to said pulses of shorter duration, and biasing means for operating a subsequent one of said electron tubes to clip the resultant pulses of normal duration.

3. A regenerative repeater for on-off signal pulses comprising means for differentiating the incoming signal pulses, an electronic oscillator producing oscillations of frequency equal to the normal pulse rate of the incoming signal pulses, phase regulating means for said oscillator, a clipper for producing from the output of said oscillator, steep-sided pulses, a comparator comprising two electronic tubes, each having an anode, a cathode and space current control means, connections for supplying said steep-sided pulses in opposite phase to the control means of said two tubes, connections for supplying the differentiated incoming signal pulses in the same phase to the control means of said two tubes, and an output circuit common to the anodes of said two tubes, connections for supplying the voltage in said output circuit to control said phase regulating means, means for delaying and differentiating said steep-sided pulses to produce pulses of shorter duration than the normal signal pulses and occurring at substantially the center of the signal pulse intervals, a gating device having an input circuit connected to receive incoming signal pulses, a second input circuit connected to receive said pulses of shorter duration, and an output circuit in which said pulses of shorter duration are repeated only in response to on signal pulses, and said pulses of shorter duration occurring simultaneously in said input circuits, and a pulse shaping circuit connected to receive the output from said gating device and comprising a plurality of tandem connected electron tubes, a coupling circuit between two of said tubes, including a capacitor of such capacitance as to produce pulses of duration equal to normal on signal pulses in response to said pulses of shorter duration, and biasing means for operating a subsequent one of said electron tubes to clip the resultant pulses of normal duration.

WILLIAM M. GOODALL.

REFERENCES CITED

The following references are of record in the file of this patent:

UNITED STATES PATENTS

| Number | Name | Date |
|---|---|---|
| 2,333,281 | Wilder | Nov. 2, 1943 |
| 2,359,649 | Kahn | Oct. 3, 1944 |
| 2,435,257 | Wilder | Feb. 3, 1948 |